June 15, 1971  M. J. JONES  3,585,074
METHOD OF DEPOSITING PHOSPHOR ON CATHODE RAY TUBE TARGET
Filed June 14, 1968
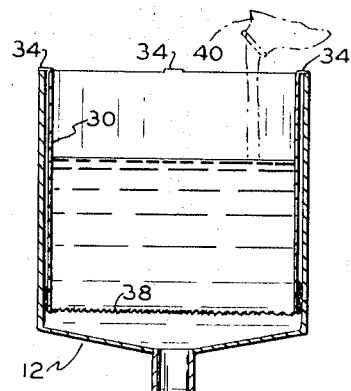
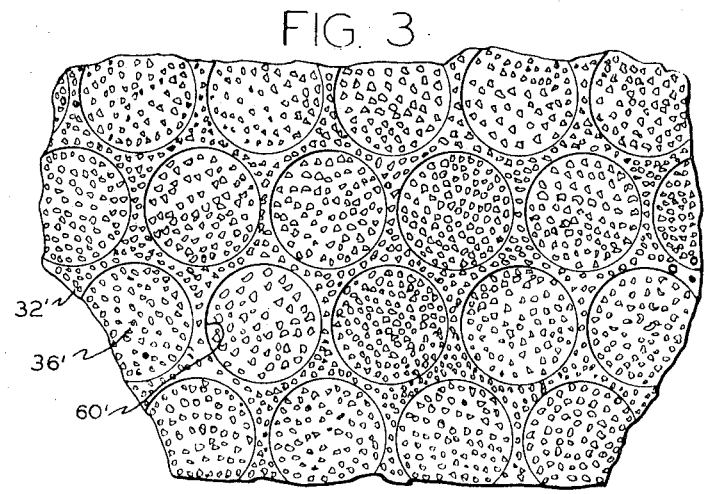
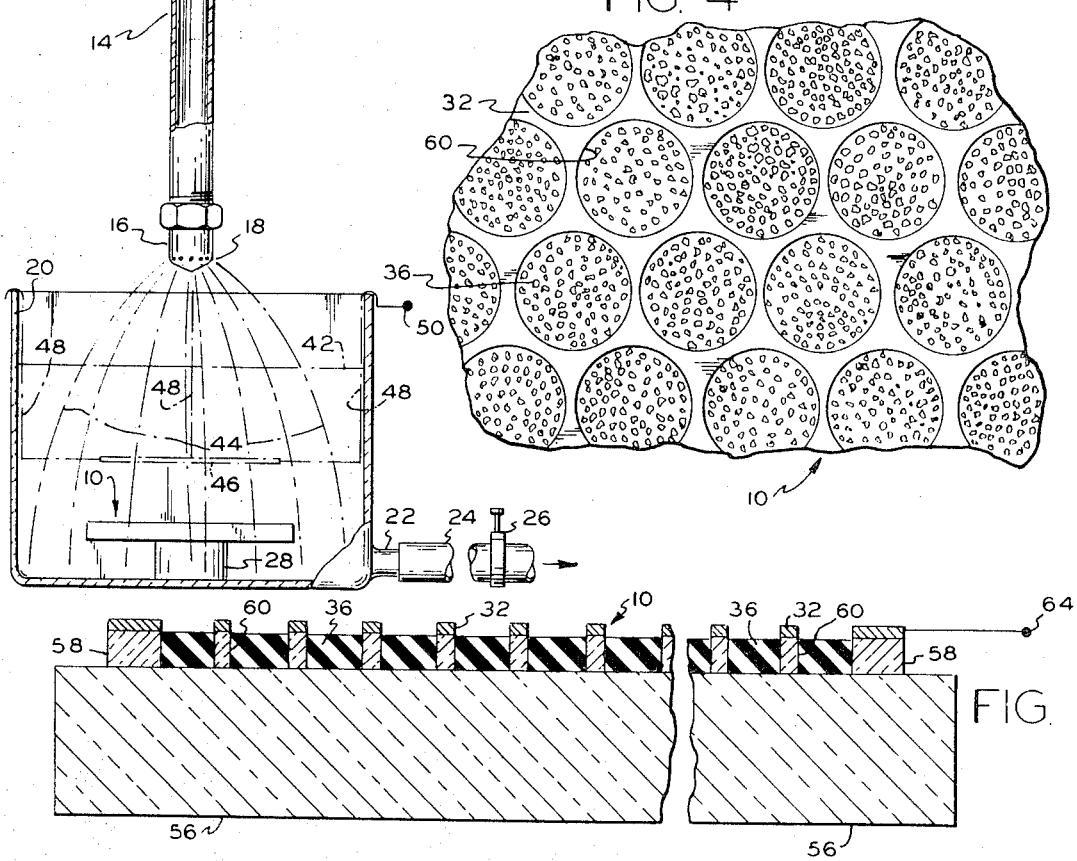
MARGARET J. JONES
INVENTOR
BY
BUCKHORN, BLORE, KLARQUIST & SPARKMAN
ATTORNEYS 3,585,074
METHOD OF DEPOSITING PHOSPHOR ON CATHODE RAY TUBE TARGET
Margaret J. Jones, Hillsboro, Oreg., assignor to Tektronix Inc., Beaverton, Oreg.
Filed June 14, 1968, Ser. No. 737,026
Int. Cl. H01j 31/08
U.S. Cl. 117—212                                    19 Claims

ABSTRACT OF THE DISCLOSURE

A storage target for a cathode ray tube includes a glass support plate having a multiplicity of depressions into which phosphor storage dielectric is differentially deposited. The target is made by immersing the plate in a volatile liquid medium and fine phosphor particles are dispersed in such medium in a manner to provide turbulent movement of the phosphor particles in the medium. The liquid medium has the property, in combination with the phosphor particles, of causing the phosphor particles to assume a charge relative to the medium such that the phosphor particles move toward and settle in the aforementioned depressions, while substantially avoiding a target mesh electrode or the like between depressions.

BACKGROUND OF THE INVENTION

Heretofore, conventional methods have been employed to apply phosphor dielectric material to three-dimensional storage targets for cathode ray tubes. For example, the phosphor dielectric material is conventionally cast onto the target in a form including a binder. In the case of targets including mesh collector electrodes and the like, the phosphor has nearly as much tendency to adhere to the mesh electrode or collector electrode as it does to the glass target structure between the electrode areas, unless a complex masking process is employed to insure deposition of the phosphor only in certain areas. When a target includes a faceplate structure having a multiplicity of depressions with a metal electrode disposed on the surface of the faceplate structure in between depressions, as in the case of targets manufactured according to the copending application of Robert W. Morris, Ser. No. 737,115, filed June 14, 1968, phosphor may be removed from the metal electrode by mechanical wiping. However, mechanical wiping methods often cause damage to the metal electrode and result in an irregular depth of the deposit. Moreover, it is desirable that the phosphor be placed in the aforementioned depressions with the top level of the phosphor being below the bottom level of the metal mesh collector electrode or the like. Leveling the phosphor to this level is, of course, nearly impossible with the metal electrode in place.

SUMMARY OF THE INVENTION

According to the present invention, phosphor is settled into areas or depressions of a target between metal electrode means by immersing the target in a volatile liquid medium, and dispersing fine phosphor particles therein. The medium, in combination with the phosphor particles, apparently has the property of causing the phosphor particles to assume a charge relative to the medium such that the phosphor particles substantially avoid the metal electrode and move toward the depressions or areas between the metal electrodes. An appropriate liquid medium comprises a volatile organic liquid compound which would, in its gaseous phase, have a dipole moment above approximately $2.5 \times 10^{-18}$ electrostatic units. A liquid medium found quite advantageous in this respect comprises a liquid medium selected from the ketones. The phosphor particles differentially settle from the medium into the aforementioned areas or depressions, and metal electrode means therebetween are substantially free of phosphor. Settling of the phosphor produces a phosphor layer of uniform depth, suitably controlled so that it does not contact metal electrode means and therefore does not light up during storage tube operation.

It is accordingly an object of the present invention to provide an improved method for depositing phosphor onto a three-dimensional target for a cathode ray tube, which phosphor is deposited only in desired areas, without deposition in undesired areas.

It is a further object of the present invention to provide an improved method for leveling deposited phosphor material into depressions in a glass target support plate while avoiding deposition on metal electrode means located between depressions.

It is a further object of the present invention to provide an improved method of depositing phosphor material in areas of a cathode ray tube target to a controlled depth relative to target electrodes and the like.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is an elevational view, partially broken away in cross section, illustrating apparatus for carrying out the method of the present invention;

FIG. 2 is a cross sectional view of a cathode ray tube storage target manufactured in accordance with the process of the present invention;

FIG. 3 is a plan view of a storage target formed according to a prior art method; and FIG. 4 is a plan view of a storage target manufactured in accordance with the method of the present invention.

DETAILED DESCRIPTION

The method of the present invention will be described with respect to a particular cathode ray tube storage target having a patterned three-dimensional glass construction. However, it will be understood that the method of the present invention can be employed for differential deposition of phosphor into preselected areas of other types of patterned three-dimensional targets.

The exemplary target is illustrated in FIGS. 2 and 4, and is of the type manufactured according to the method of the copending application of Robert W. Morris, Ser. No. 737,115, filed June 14, 1968, entitled "Storage Target for Cathode Ray Tube and Method of Manufacture," and assigned to the assignee of the present invention. Referring to FIG. 2, a glass support plate or faceplate 56 has adhered thereto a layer of insulating material 58 suitably formed of glass, provided with depressions or apertures 60 which have substantially straight sides. These apertures may take the form of right circular cylinders separated from one an other by insulating material 58, and metal mesh electrode 32 above insulating material 58. Apertures 60 may alternatively take on other shapes, e.g. they may be hexagonal or square in cross section. In the case of right cylindrical apertures, the cylindrical axis is perpendicular to the faceplate 56.

A phosphor material 36 is located in the apertures and desirably has a uniform depth starting from the surface of faceplate 56 and extending adjacent but below the lower surface of mesh electrode 32. Mesh electrode 32 is disposed on the upper exposed edge of insulating material 58 and is provided with apertures matching the depressions or apertures 60 in insulating layer 58. A conductor connects mesh electrode 32 to a terminal 64, e.g. for connection to a source of voltage when the target electrode is included in a cathode ray tube. At such time, electrons are attracted toward mesh electrode 32 and strike phosphor 36, causing the phosphor to retain a positive condition for attracting more electrons and "storing" a desired pattern of illumination.

A target similar to the target shown in FIG. 2 is also illustrated in FIG. 4 of Gibson Pat. 3,293,474 issued Dec. 20, 1966 entitled "Phosphor Dielectric Storage Target For a Cathode Ray Tube," and assigned to the assignee of the present invention. In accordance with the aforementioned application of Robert W. Morris, Ser. No. 737,115, filed June 14, 1968, glass insulating layer 58 is deposited as a frit or glaze which is adhered to glass support plate or faceplate 56. Metal for forming a mesh electrode 32 is evaporated on insulating layer 58, such metal suitably comprising a layer of gold over a layer of nickel employed to adhere the gold to glass insulating layer 58. A layer of photoresist is applied over the gold and such photoresist is exposed to a contact pattern for the desired configuration, e.g. the configuration of the electrode as illustrated in FIG. 4. The photoresist is then developed for leaving a protective coating of photoresist on top of the metal layer, and an etchant is applied which will etch the metal, from which mesh electrode 32 is formed, into the desired shape. Thereafter, an etchant is applied which will etch insulating material 58 but which will not etch faceplate 56. As a result, the insulating layer 58 is etched down to the faceplate 56 to provide apertures or depressions 60 having straight substantially parallel walls and flat bottoms. In the target illustrated, the apertures 60 were approximately three to four mils in diameter, and were spaced four to five mils apart, e.g. leaving one-half to one mil between apertures. The layer 58 was ten to thirty microns in thickness.

Several phosphors are suitable for deposition in apertures 60 according to the method of the present invention. Among the phosphors which have been deposited at 36 are both silicate and sulphide phosphors such as General Electric P31 number 118-2-17, Levy West P31 number FF12, RCA P18 number 33C628, U.S. Radium P5 blue, General Electric P20, and General Electric P1. Apparently the phosphor should have somewhat irregularly shaped particles, i.e. other than spherically shaped, to produce best results. Differences in performance as between phosphors is minimized when a higher dipole moment medium such as acetonitrile is employed.

As has been mentioned, it is desired that phosphor 36 be deposited in apertures 60 to a uniform depth without touching mesh electrode 32. If the phosphor 36 in each aperture 60 contacts the mesh electrode 32 all around the periphery of the aperture or depressions, the grains of phosphor touching mesh electrode 32 will light up in the usual storage tube, whether or not such illumination is desired. The result tends to be an unwarranted background lighting, decreasing the contrast of the viewed or stored image, and decreasing the range of useful phosphors which may be employed. For example, phosphors not exhibiting exceptional inherent contrast properties will not be as suitably employed if contacted by mesh electrode 32. The sulphide phosphors, for example, which have extremely long life under operating condition realize their maximum capabilities only when they are not contacted with a mesh electrode.

According to prior art method of manufacturing a three-dimensional glass target of the type illustrated in FIG. 2, the phosphor would be cast into apertures 60 and then mechanically wiped from the surface of mesh electrode 32. Unfortunately, mechanical wiping is not apt to perfectly remove the phosphor from the surface of mesh electrode 32, but leaves the mesh electrode substantially coated with phosphor. Such a situation is shown in FIG. 3 where the results of this prior art method are illustrated. This figure, like FIG. 4, is drawn from an actual photograph illustrating process results. As can be seen in FIG. 3, mesh electrode 32' is still located with phosphor. The phosphor coating mesh electrode 32' will tend to produce a continuous background illumination, and moreover, it will be appreciated that mechanical wiping will not lower the surface of the phosphor 36' below the surface of mesh electrode 32', and edge lighting of the phosphor 36' in apertures or depressions 60 will result. Moreover, mechanical wiping of the phosphor from mesh electrode 32' tends to damage metal electrode 32' which ordinarily has a thickness of on the order of 1,000 angstroms.

Attempts have been made to produce the illustrated target by ordinary settling processes where the phosphor settles from a suspension onto the target. However, the ordinary settling process produces a result similar to that illustrated in FIG. 3, i.e. the phosphor has substantially the same tendency to settle upon mesh electrode 32' as it does in apertures 60'.

According to the present invention, phosphor is differentially settled into apertures 60' by substantially suspending fine phosphor particles into a medium immediately above the top surface of the target, wherein such medium has the property, in combination with the phosphor particles, of causing the phosphor particles to assume a charge relative to the medium whereby the phosphor particles substantially avoid the metal mesh electrode 32 or 32' and move toward the areas defined by apertures 60. The medium is a volatile liquid, and is substantially dielectric. While the mechanism of charging in this differential deposition is not completely understood, several possible explanations may be offered for this action. One source of charge could be dissociation and/or absorption of ions in the suspension comprising the phosphor particles and the liquid medium. Alternatively, the source of charge may be the contact potential between the two phases, or some combination of these explanations may apply. More likely, the charge is at least associated with the electrical dipoles which may be formed by the phosphor molecules, and by molecules of the medium in which the phosphor is suspended. Organic liquid media found experimentally to be suitable have dipole moments above $2.5 \times 10^{-18}$ electrostatic units in the gaseous phase, as listed in "The Handbook of Chemistry and Physics," volume 46, published by the Chemical Rubber Co. At any rate, the phosphor particles dispersed in a properly selected liquid medium are differentially attracted as between positive and negative electrodes which may be inserted in the medium, and this test can also be applied to some extent in selecting the medium.

When the phosphor particles are dispersed in such a medium above the target, the phosphor settles almost completely in depressions or apertures 60, and almost no phosphor is disposed on mesh electrode 32. The phosphor deposits levelly, resulting in a common depth of phosphor deposition in each of the apertures 60 and substantially identical storage properties across the target. The phosphor depth is determined, of course, by how much phosphor is dispersed in the liquid medium, and the depth of phosphor can be gauged so that the top of phosphor 36 is below the bottom of mesh electrode 32. Therefore, undesired peripheral lighting of the phosphor 36 around the edge of apertures 60 is avoided.

As has been stated, an appropriate liquid medium in which the phosphor particles may be suspended comprises an organic compound which would, in its gaseous phase, have a dipole moment above approximately $2.5 \times 10^{-18}$ electrostatic units. Liquid media successfully employed include acetone, methyl ethyl ketone, methyl isobutyl ketone, cyclohexanone, isopharone, ethyl acetoacetate, and acetonitrile. As can be seen, many of these compounds are either ketones or contain ketone groups. Therefore, the ketone class is found quite suitable, although acetonitrile, for example, is also found to be particularly advantageous.

FIG. 1 illustrates an apparatus for carrying out the method of the present invention, and further description of the method will be made with reference to FIG. 1. The FIG. 1 apparatus includes a cylindrical aluminum funnel 12 having an aluminum stem 14 provided at its lower extremity with dispersing tip 16 having a plurality of evenly spaced holes 18 around the lower periphery thereof. In a particular example, there were fifteen holes, each of which was 0.03 inch in diameter. The holes are disposed principally around the edge of the dispersing tip for reasons that will more clearly appear hereinafter.

The funnel is supported (by means not shown) above a glass container 20 having a lower drain 22 to which rubber tubing 24 is attached. A stop cock 26 is employed to controllably close rubber tubing 24, this stop cock normally being closed. The top edge of container 20 is located below the lower extremity of dispersing tip 16, and the glass ring 28 is positioned at the bottom of container 20 for supporting target 10 horizontally and levelly within the container, with the top surface of the target including insulating layer 58 and apertures 60 oriented upwardly. Also, the top surface of the target is located well below the top edge of the container so that the target is readily immersed in a liquid medium within the container.

A stainless steel filter holder 30 is supported in the top of the funnel on tabs 34, and this filter holder is cylindrical and supports a filter cloth 38 completely across the cylindrical cross section of the holder, e.g. at its lower extremity. The cloth 38 is suitably formed of silk, and is suspended by the filter holder approximately one-quarter inch from the bottom of funnel 12 above stem 14.

Further according to the process of the present invention, the target 10 is levelly supported on support 28 as hereinafter indicated, and a selected volatile liquid medium is poured into the open top of funnel 12, e.g. from a container 40. Approximately a liter of such liquid may be poured into funnel 12, and the same passes through filter cloth 38 and leaves dispersing tip through holes 18. As illustrated in the drawing at 44, the liquid medium oversprays the target, this being a reason for the location of holes 18 substantially around the periphery of dispersing tip 16. That is, the spray from holes 18 desirably falls around the edge of the target under normal conditions without directly spraying the target. The settling medium is poured through the filter until a level thereof in container 20 is some distance above target 10, e.g. approximately three inches thereabove. Then, approximately 100 milliliters of the same liquid medium, mixed in advance with fine particles of phosphor material and agitated to keep the phosphor from settling, is poured into the partially emptied funnel 12. It should be noted that no binder is employed. As the phosphor mixture is poured into the partially empty funnel 12, the spray is continuing to emanate from dispersing tip 16. The filter cloth 38 filters out caked particles of phosphor and contaminants, and keeps the flow from proceeding too rapidly. However, for the most part, the phosphor leaves through holes 18 in dispersing tip 18, and oversprays the target 10 which is now immersed substantially below liquid level 42 in container 20. The spray of the phosphor-containing mixture into the medium in container 20 provides appreciable initial turbulence of the phosphor particles in the medium in the container, and appears to enhance the electrical charge thereof. The phosphor particles are then substantially suspended in the medium in container 20 above the top surface of the target. As the flow of medium from dispersing tip 16 almost ceases, a cover for container 20 is slid underneath dispersing tip 16 to catch the drip.

With the container 20 covered, a few minutes are allowed for the phosphor to settle toward target 10. This can be ascertained by observance of the medium. Settling is continued until the medium becomes visibly clear. Then, the stop cock 26 is opened, and the container is carefully drained, with the container being covered only loosely to allow evaporation of the liquid medium as may accompany the phosphor in apertures 60 of the storage target. After a few minutes, e.g. one-half an hour to an hour, the liquid medium will have substantially evaporated, leaving a level deposit of phosphor 36 within apertures 60 and substantially no phosphor on mesh electrode 32. The phosphor is sufficiently adherent within the apertures 60 so that the target may then be moved. A typical depth of phosphor 36 is approximately ten to fifteen microns.

The overspraying of the mixture around the target produces even distribution of the phosphor in the medium above the target to provide even settling. The container 20 is at least loosely covered during evaporation of the last of the liquid medium to prevent any vigorous air flow over the container so that rippling of the phosphor surface will not occur.

In a particular example, one liter of acetone was poured into funnel 12, and when the funnel was half empty, 0.7 gram of an aforementioned P31 phosphor thoroughly mixed in 100 milliliters of acetone and pre-agitated was poured into the funnel 12 within filter holder 30. After the mixture sprayed into the container 20, the container 20 was loosely covered, and the phosphor dispersed in the acetone settled onto a target of approximately five inches in length. After the acetone became substantially visibly clear, stop cock 26 was opened allowing the acetone to flow out. The remaining acetone evaporated in approximately twenty minutes.

In another example, the same process was repeated, employing methyl ethyl ketone instead of acetone, and in yet another example acetonitrile was employed instead of acetone. The process was the same in each case except the evaporation time for the medium was approximately one hour instead of twenty minutes.

As hereinbefore stated, the mechanism by which the differential deposition of the phosphor takes place is not completely understood. It is not clear why the charged phosphor particles prefer the glass apertures or depessions 60 to the mesh electrode 32. One possible explanation is that the difference between the dielectric constant of glass and the dielectric constant of the medium is such that the glass would assume a negative charge relative to the medium. It has also been observed that when electrodes (not shown) connected to a voltage source are inserted in a medium containing the suspended phosphor, the phosphor particles tend to migrate more toward the negative electrode and less toward the poistive electrode, thereby indicating a probable positive charge on the phosphor particles. It is postulated that the phosphor particles then prefer the relatively negatively charged glass. Alternatively, the charged particles may have increased mobility or repulsion between one another, and therefore have less tendency to remain on the top of a mesh electrode 32. It is noted no binder is used in the present process. The repulsive forces between particles may cause the same to drop into apertures 60. In any case, it is understood that the present invention is not limited by the possible theoretical explanation thereof.

The exclusive deposition of phosphor material in apertures 60 may be further enhanced by applying a potential to mesh electrode 32 during the settling operation. For this purpose, a positive voltage is applied to terminal 64 during settling, while the negative terminal of the voltage supply is suitably returned by means of a terminal 50 to a nickel mesh 46 suspended in container 20 on wires 48. The mesh 46 is disposed well above the top surface of the target. A D.C. voltage of approximately 60 volts has been found the most suitable value for enhancing the differential deposition of the phosphor into apertures 60. The application of this voltage does not appear to make any difference in the selection of the media in which the phosphor is suspended, but nevertheless somewhat enhances the differential settling action. It is understood that this application of a voltage to the mesh electrode 32 is not essential to the practice of the invention in its broader aspects.

While the deposition of phosphor has been herein described in connection with a particular target structure, it is understood that the process of the present invention may be applied to other three-dimensional target structures, for example, to the target described and claimed in the copending application of Roger A. Frankland, Ser. No. 619,904, filed Feb. 28, 1967, entitled "Cathode Ray Storage Tube and Method of Manufacture," which is assigned to the assignee of the present invention.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. The method of levelly depositing phosphor material onto first areas provided in the top surface of a patterned three-dimensional glass target for a cathode ray tube, without substantial deposition of said phosphor on metal electrode means disposed on said top surface of said target between said first areas, said method comprising:

locating said target at a level position within a container with the top surface of the target oriented upwardly and located below the top of said container so that said target may be immersed in a liquid medium within said container, immersing said target in a substantially dielectric volatile liquid medium within said container, dispersing fine phosphor particles in said medium so that said fine phosphor particles are substantially suspended in said medium above the top surface of said target, said substantially dielectric volatile liquid medium having the property in combination with said phosphor particles of causing said phosphor particles to assume a charge relative to said medium such that said phosphor particles substantially avoid said metal electrode means and move toward said first areas, said medium comprising an organic compound in its liquid phase, which would, in its gaseous phase, have a dipole moment above approximately $2.5 \times 10^{-18}$ electrostatic units, settling said phosphor particles toward said target, and removing said medium at least partially by evaporation leaving said phosphor particles in said first areas.

2. The method according to claim 1 wherein said medium at least includes a ketone.

3. The method according to claim 1 wherein the medium comprises an organic compound selected from the group consisting of acetone, methyl ethyl ketone, methyl isobutyl ketone, cyclohexanone, isopharone, ethyl acetoacetate, and acetonitrile.

4. The method according to claim 1 wherein said phosphor particles are dispersed in said medium with turbulence of said particles in said medium for enhancing said charge.

5. The method according to claim 1 wherein said target is first immersed in a liquid medium in said container after which said phosphor particles are added thereto by overspraying said target with phosphor particles mixed in liquid medium.

6. The method according to claim 1 wherein the major portion of said liquid medium is drained from said container after settling and before evaporation.

7. The method according to claim 1 wherein said container is at least partially covered during evaporation.

8. The method according to claim 1 wherein an external voltage is applied to said metal electrode means.

9. The method of levelly depositing phosphor material onto first areas provided in the top surface of a patterned three-dimensional glass target for a cathode ray tube, without substantial deposition of said phosphor on metal electrode means disposed on said top surface of said target between said first areas, said method comprising:

locating said target at a level position within a container with the top surface of the target oriented upwardly and located below the top of said container so that said target may be immersed in a liquid medium within said container, immersing said target within said container in a volatile liquid medium at least a major portion of which comprises a ketone, wherein the top surface of said target is covered thereby, pouring fine phosphor particles mixed with a volatile liquid medium at least a major portion of which comprises a ketone into said container so that said fine phosphor particles are dispersed within the medium in the container and are substantially suspended in said medium above the top surface of said target, settling said phosphor particles toward said target, and removing said medium at least partially by evaporation leaving said phosphor particles in said first areas.

10. The method according to claim 9 wherein said phosphor particles mixed with said medium are poured into said container in a manner to provide initial turbulence of phosphor particles in medium in the container.

11. The method according to claim 9 wherein said phosphor particles mixed with said medium are poured into said container through a dispersing tip for spraying the mixture into the medium in the container.

12. The method according to claim 9 wherein said phosphor particles are poured into said container mixed with said medium by overspraying said target so that said particles at least initially become dispersed in the medium in said container substantially around the periphery of said target.

13. The method according to claim 9 wherein the mixture of phosphor particles and medium is agitated before pouring into said container and wherein said mixture is poured through a filter.

14. The method according to claim 9 wherein said container is at least partially covered during evaporation.

15. The method according to claim 9 wherein the phosphor particles are settled to a level below the level of the lower surface of the metal electrode means.

16. The method according to claim 9 wherein a positive voltage is applied to said electrode means.

17. The method according to claim 9 wherein a positive voltage is applied to said electrode means relative to another electrode means located in said medium.

18. The method of manufacture of a charge image storage target for a cathode ray storage tube by which phosphor material is selectively deposited onto the surface of a light transparent target support member of insulating material having a metal electrode coated on a portion of such surface to provide phosphor storage dielectric areas of substantially uniform thickness on the uncoated surface portions, comprising the steps of:

forming a liquid suspension of phosphor particles and a volatile dielectric liquid medium which causes the phosphor particles to become electrically charged, said medium comprising an organic compound in its liquid phase, which would, in its gaseous phase, have a dipole moment above approximately $2.5 \times 10^{-18}$ electrostatic units, immersing the support member in said liquid suspension with said surface oriented upward, settling the phosphor particles onto said surface of said member so that the said phosphor particles are selectively deposited onto the uncoated surface areas of said surface without any substantial deposition of phosphor onto the metal electrode coated surface portion and removing the liquid medium from said member at least partially by evaporation while leaving the phosphor particles on said member to form the storage dielectric areas.

19. The method according to claim 18 in which the support member is a glass plate having a plurality of spaced depressions in said surface into which the phosphor material is deposited and raised portions on said surface which surround such depressions and are coated with a metal mesh electrode.

References Cited

UNITED STATES PATENTS 3,475,169  10/1969  Lange _____ 117—33.5X

ALFRED L. LEAVITT, Primary Examiner

W. F. CYRON, Assistant Examiner

U.S. Cl. X.R.

117—33.5, 37

UNITED STATES PATENT OFFICE
CERTIFICATE OF CORRECTION

Patent No. 3,585,074                  Dated June 15, 1971

Inventor(s) Margaret J. Jones

It is certified that error appears in the above-identified patent and that said Letters Patent are hereby corrected as shown below:

Col. 2, line 62, "an other" should be -- another --.

Col. 4, line 5, "located" should be -- coated --.

Col. 6, line 50, "poistive" should be -- positive --.

Signed and sealed this 28th day of December 1971.

(SEAL)
Attest:

EDWARD M. FLETCHER, JR.
Attesting Officer

ROBERT GOTTSCHALK
Acting Commissioner of Patents